(12) United States Patent  (10) Patent No.: US 8,671,347 B2
Bromer  (45) Date of Patent: Mar. 11, 2014

(54) QUANTIFYING FRUSTRATION VIA A USER INTERFACE

(75) Inventor: Nicholas S. Bromer, Marietta, PA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/499,402

(22) PCT Filed: Jan. 7, 2011

(86) PCT No.: PCT/US2011/020576
§ 371 (c)(1),
(2), (4) Date: Mar. 30, 2012

(87) PCT Pub. No.: WO2012/094021
PCT Pub. Date: Jul. 12, 2012

(65) Prior Publication Data
US 2012/0226993 A1    Sep. 6, 2012

(51) Int. Cl.
*G06F 3/00* (2006.01)
(52) U.S. Cl.
USPC ............................ 715/744; 715/746; 715/866
(58) Field of Classification Search
USPC .......................................... 715/866, 744, 746
See application file for complete search history.

(56) References Cited

U.S. PATENT DOCUMENTS

| | | | |
|---|---|---|---|
| 6,064,381 A * | 5/2000 | Harel | 715/705 |
| 6,976,218 B2 * | 12/2005 | Stanford-Clark | 715/744 |
| 7,123,241 B2 | 10/2006 | Bathiche | |
| 7,509,686 B2 | 3/2009 | Checco | |
| 7,665,024 B1 | 2/2010 | Kondziela | |
| 7,728,735 B2 | 6/2010 | Aaron et al. | |
| 7,930,676 B1 * | 4/2011 | Thomas | 717/100 |
| 8,024,660 B1 * | 9/2011 | Quinn et al. | 715/745 |
| 2003/0110450 A1 | 6/2003 | Sakai | |
| 2006/0190822 A1 * | 8/2006 | Basson et al. | 715/700 |
| 2009/0002178 A1 | 1/2009 | Guday et al. | |
| 2009/0140864 A1 | 6/2009 | Aaron et al. | |
| 2009/0280909 A1 | 11/2009 | McEniry | |
| 2010/0037187 A1 * | 2/2010 | Kondziela | 715/866 |

(Continued)

FOREIGN PATENT DOCUMENTS

JP    2000330676 A    11/2000
JP    2001022488 A    1/2001

OTHER PUBLICATIONS

Kapoor et al., Automatic prediction of frustration, Mar. 5, 2007, www.sciencedirect.com.*

(Continued)

*Primary Examiner* — Nicholas Ulrich

(57) ABSTRACT

Method, apparatus and system to modify a user interface implemented in a communication network associated with a plurality of mobile devices. In one embodiment a mobile device associated with a communication network is configured to sense mood data that quantifies a frustration parameter based at least in part on interaction of a user with a user interface mode portion of a user interface and associates the mood data with mode data, wherein the mode data identifies the user interface mode operation of a user interface and transfers the mood data and the mode data to a mobile service provider portion of the communication network. Furthermore, the mobile service provide may transfer at least a portion of an updated user interface to one or more of the plurality of mobile devices based at least in part on the identification of the one or more user interface modes that are frustrating.

32 Claims, 7 Drawing Sheets

(56) References Cited

U.S. PATENT DOCUMENTS

| | | | | |
|---|---|---|---|---|
| 2010/0082516 | A1* | 4/2010 | Basu et al. | 706/47 |
| 2010/0229112 | A1* | 9/2010 | Ergan et al. | 715/764 |
| 2010/0305991 | A1* | 12/2010 | Diao et al. | 705/7 |
| 2011/0283189 | A1* | 11/2011 | McCarty | 715/707 |
| 2012/0068845 | A1* | 3/2012 | Kruglick | 340/540 |
| 2012/0185420 | A1* | 7/2012 | Lappalainen et al. | 706/14 |

OTHER PUBLICATIONS

Australian International Searching Authority, International Search Report and Written Opinion of the International Searching Authority for PCT/US2011/020576, mailed on May 17, 2011.

Wikipedia, Keystroke Dynamics, last modified Mar. 20, 2012, accessed online on Mar. 29, 2012 via http://en.wikipedia.org/wiki/Keystroke_dynamics.

Clarke, N. L., et al., Keystroke dynamics on a mobile handset: a feasibility study, Information Management & Computer Security, 2003, pp. 161-166, vol. 11, Issue 4, MCB UP Limited.

Kaklauskas, A., et al., Web-based biometric mouse decision support system for user's emotional and labour productivity analysis, The 25th International Symposium on Automation and Robotics in Construction, Jun. 26-29, 2008, ISARC-2008, pp. 69-75.

Ganapati, Priya, Sony promises emotion detecting touchscreen table, May 3, 2010, accessed online on Mar. 29, 2012 via http://www.wired.com/gadgetlab/2010/05/sony-promises-emotion-detecting-touch-screen-table/.

Allen, Jeffrey D., Pressure-sensitive keystroke dynamics dataset, Apr. 16, 2010, accessed online on Mar. 29, 2012 via http://jdadesign.net/2010/04/pressure-sensitive-keystroke-dynamics-dataset/.

Martinez-Yelmo, Isaias, et al., Fair quality of experience (QoE) measurements related with networking technologies, Lecture Notes in Computer Science, 2010, vol. 6074, Wired/Wireless Internet Communications, pp. 228-239.

Allen, J.D., "Pressure-Sensitive Keystroke Dynamics Dataset," accessed at http://jdadesign.net/2010/04/pressure-sensitive-keystroke-dynamics-dataset/ accessed on Mar. 15, 2013, pp. 1-7.

Hai-Rong, L., et al., "Emotion recognition based on pressure sensor keyboards," IEEE International Conference on Multimedia and Expo, pp. 1089-1092 (2008).

Satoshi, U., et al., "QoS/QoE Measurement System Implemented on Cellular phone for NGN," IEEE CCNC, pp. 117-121 (2008).

Zavadskas, E., et al. "Web-Based Biometric Mouse Intelligent System for Analysis Of Emotional State and Labour Productivity," The 25th International Symposium on Automation and Robotics in Construction, pp. 429-434 (2008).

www.biochec.com, Keystroke Biometrics Advantage, copyright 2002-2012, retrieved on Jul. 19, 2013.

\* cited by examiner

500 A computer program product.

502 A signal bearing medium.

504 Machine-readable instructions, which, if executed by one or more processors, operatively enable a computing device to:

receive, via a mobile service provider portion of a communication network, mood data and mode data from one or more of a plurality of mobile devices, wherein the mood data quantifies a frustration parameter based at least in part on interaction of a user with a user interface mode portion of a user interface of an individual mobile device;

identify, via the mobile service provider, one or more user interface modes that are frustrating based at least in part on the mood data and the mode data; and/or transfer, via the mobile service provider, at least a portion of an updated user interface to one or more of the plurality of mobile devices based at least in part on the identification of the one or more user interface modes that are frustrating.

| 506 a computer-readable medium. | 508 a recordable medium. | 510 a communications medium. |

Fig. 5

QUANTIFYING FRUSTRATION VIA A USER INTERFACE

BACKGROUND

Unless otherwise indicated herein, the approaches described in this section are not prior art to the claims in this application and are not admitted to be prior art by inclusion in this section.

The action of a person's fingers on a keyboard is often discussed as "keystroke dynamics," which is the subject of numerous studies. Such studies mention that keystroke dynamics may vary with that person's emotional state. For example, people may tap harder when angry.

Keystroke dynamics may often be used for biometric identification via a computer keyboard; however, emotion measurement based on keystroke dynamics has also been investigated. Such investigations mention that moods, illness, and the like can affect a person's keystroke dynamics. While many such investigations seem to be directed to the on/off timing of the keystrokes, key force or pressure has also been investigated for determining emotions.

SUMMARY

Some example methods, apparatus, and systems related to quantifying frustration via a user interface may be implemented in a communication network associated with a plurality of mobile devices. Such methods may include receiving, via a mobile service provider portion of the communication network, mood data and mode data from one or more of the plurality of mobile devices. Such mood data may quantify a frustration parameter. Such a quantification of a frustration parameter may be based at least in part on interaction of a user with a user interface mode portion of a user interface of an individual mobile device. Identification, via the mobile service provider, of one or more user interface modes that are frustrating may be done based at least in part on the mood data and the mode data. Transfer, via the mobile service provider, of at least a portion of an updated user interface to one or more of the plurality of mobile devices may be based at least in part on the identification of the one or more user interface modes that are frustrating.

Some example methods, apparatus, and systems related to quantifying frustration via a user interface may be implemented in a mobile device associated with a communication network. Such methods may include sensing, via the mobile device, mood data that may quantify a frustration parameter based at least in part on interaction of a user with a user interface mode portion of a user interface. Association, via the mobile device, of the mood data may be made with mode data, where the mode data may identify the user interface mode portion of a user interface. Transfer, via the mobile device, of the mood data and the mode data may be made to a mobile service provider portion of the communication network.

Some example methods, apparatus, and systems related to quantifying frustration via a user interface may be implemented in a communication network associated with a mobile device. Such methods may include receiving mood data and mode data from one or more of a plurality of mobile devices associated with a mobile service provider portion of a communication network. Such mood data may quantify a frustration parameter. Such a quantification of a frustration parameter may be based at least in part on interaction of a user with a user interface mode portion of a user interface of an individual mobile device. Identification of one or more user interface modes that are frustrating may be done based at least in part on the mood data and the mode data. Transfer of at least a portion of an updated user interface to one or more mobile devices may be based at least in part on the identification of the one or more user interface modes that are frustrating.

Some examples may include a method implemented in a communication network associated with a plurality of mobile devices, including: measuring user interaction with a user interface common to the mobile devices, via interface sensors of time and/or force included in at least a subset of the mobile devices; numerically quantifying sensor data as a mood datum, where the mood datum may quantify a user's frustration during interaction of the user with the user interface during a particular mode of operation of the user's mobile device; identifying the particular mode of operation; for each particular mode of operation, correlating the mood data associated with that particular mode of operation; determining an aggregate measure of frustration for each particular mode of operation as a mathematical function of the mood data of users that may be associated with that particular mode of operation; identifying, via the mobile service provider, one or more modes of operation that may be frustrating based at least in part on a mathematical function;

and outputting information on the frustrating modes of operation.

Some examples may further include the method above, where the user interface mode of operation may include a group of one or more functions and/or transfers between the functions, where the functions are defined or bordered by keystrokes or swipes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of an example computer program product that is arranged in accordance with at least some embodiments of the present disclosure;

DETAILED DESCRIPTION

Figure 1:
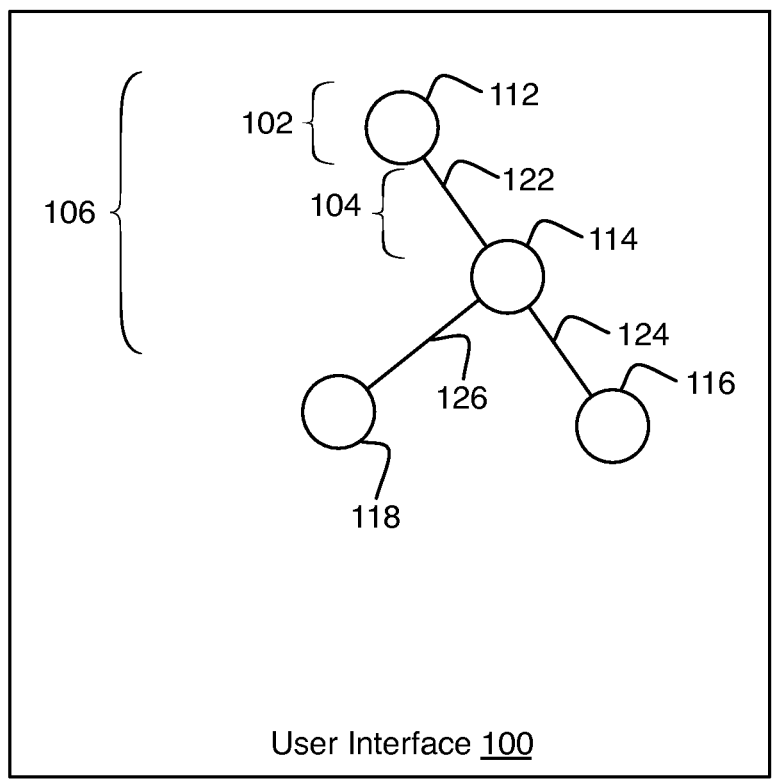
FIG. 1 illustrates an example diagram of various modes associated with a user interface that is arranged in accordance with at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to quantifying frustration via a user interface.

The user of a mobile device (such as a cell phone) may interact with the mobile device through keystrokes. Accordingly, keystrokes may be mined for information on the user's emotional state. People's tapping or stroking dynamics may change when they are frustrated or angry. As will be described below in greater detail, a mobile device (and/or the system it is connected to) may sense and/or analyze the timing, force, speed, etc. of key taps or strokes to detect anger or frustration of a user. Further, a correlation may be made of the detected degree of frustration with the current use (e.g., a mode) of the mobile device. Data from many users may be aggregated into a composite value (such as by averaging or the like), and the results may be utilized to indicate what functions of the mobile device are most frustrating. This may allow corrective action to be taken to reduce user frustration.

FIG. 1 illustrates an example diagram of various modes associated with a user interface that is arranged in accordance with at least some embodiments of the present disclosure. As illustrated, a user interface 100 may permit a user (not shown) to operate a mobile device (see FIG. 4) in various modes, illustrated conceptually here by numerals 102, 104, and/or 106. Such modes 102, 104, and/or 106 may include one or more functions (illustrated conceptually here by numerals 112, 114, 116, and/or 118) and/or one or more transfers (illustrated conceptually here by numerals 122, 124, and/or 126) between the functions. As used herein the term "user interface" may include a graphical user interface, a voice command user interface, the like, and/or combinations thereof. For example, such functions may be associated with one or more of the following aspects of such a user interface: a user interface screen, a user interface menu, a user interface icon, a text box, a user interface button, a user interface check box, a user interface folder, a user interface file, a voice command interface, the like, and/or combinations thereof.

In the illustrated example, mode 102 is illustrated as being associated with a single function, function 112, for example. For example, a user's current position in a menu tree might be designated as mode 102. Similarly, mode 104 is illustrated as being associated with a single transfer, transfer 122, for example. For example, an attempt by a user to transfer from a contact list-type function to a main menu-type function might be designated as mode 104. Likewise mode 106 is illustrated as being associated with a combination of functions and transfers, function 112, transfer 122, and function 114, for example. For example, an attempt by a user to access an alarm clock function after starting at a main menu in a menu tree might be designated as mode 106. Other examples of such modes might include placing a call, navigating a menu, accessing the web, etc. As discussed above, other modes may include one or more functions (illustrated conceptually here by numerals 116 and/or 118) and/or one or more transfers (illustrated conceptually here by numerals 124 and/or 126) between the functions.

Accordingly, as used herein the term "mode" may refer to a state bordered by two distinguishable, identifiable, functionally-operative, and/or functionally-defined input operations. Such operations might be two keystrokes on a keyboard; two taps, swipes, contractions, etc. on an input surface (e.g., a contraction may refer to two fingers on an input surface moving together), the like, and/or combinations thereof; two operations in a virtual display; or any other input operations including physical actions which are quantifiable, measurable, and/or comparable in terms of physical quantities (such as force, speed, direction, acceleration, duration, etc.), or in terms of combinations of such physical quantities, or in terms of such physical such quantities as respective functions of time, and so on. One example might be a particular sequence of keystrokes that lead up to setting the alarm clock function on a mobile phone. In such an example, the mode of operation may be setting the time, or setting AM or PM, or setting both of those, or the entire portion of the menu devoted to the alarm clock function. Thus, distinguishable, identifiable, and/or functionally-operative, and/or functionally-defined input operations may function two ways: either as things that are quantifiable and/or measurable to determine mood data; and/or as things that define a current mode, a preceding mode, or some other mode, either as end points of the mode, beginning points of the mode, or as combinations and/or permutations that are associated with the mode.

Figure 2:
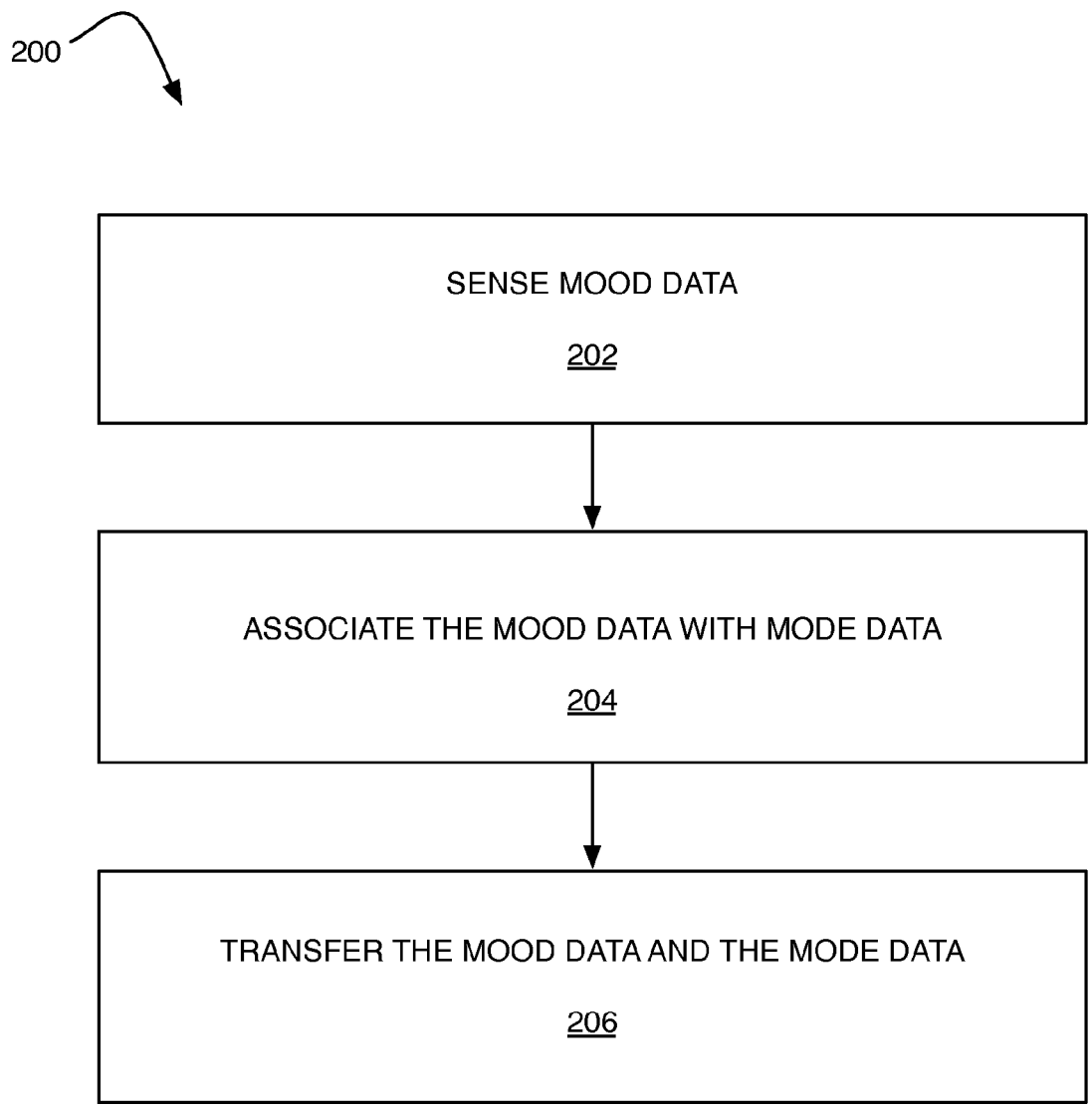
FIG. 2 illustrates an example process for quantifying frustration via a user interface that is arranged in accordance with at least some embodiments of the present disclosure.

FIG. 2 illustrates an example process for quantifying frustration via a user interface that is arranged in accordance with at least some embodiments of the present disclosure. Process 200, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 2 may be practiced in various implementations. For example, although process 200, as shown in FIG. 2, may comprise one particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Process 200 may include one or more of functional operations as indicated by example operations 202, 204, and/or 206.

Figure 4:
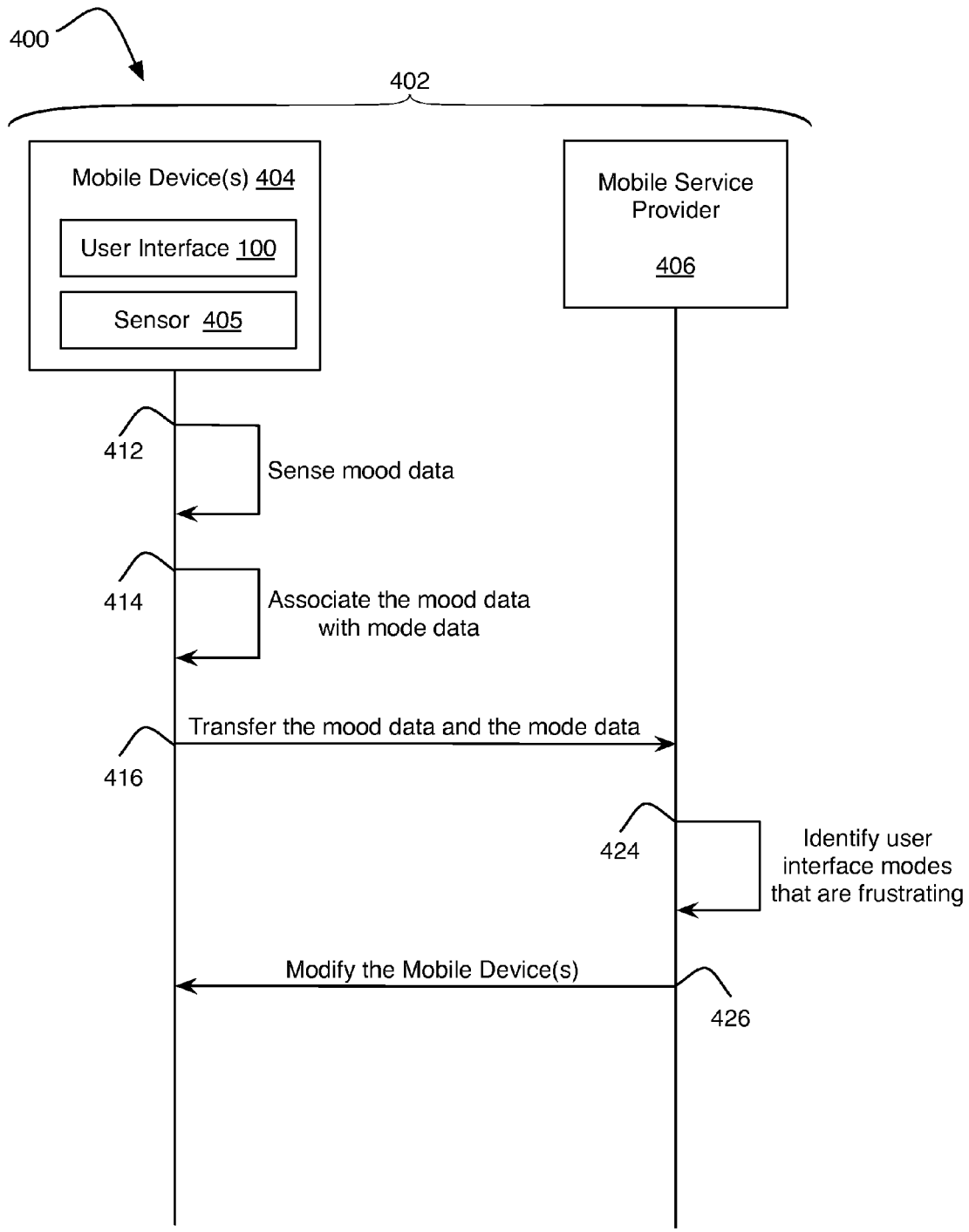
FIG. 4 illustrates a further example process for quantifying frustration via a user interface that is arranged in accordance with at least some embodiments of the present disclosure.

As illustrated, process 200 may be implemented for quantifying frustration via a user interface that may be implemented in a mobile device (see FIG. 4) associated with a communication network (see FIG. 4). Processing may begin at operation 202, "sense mood data", where mood data may be sensed. For example, mood data may be sensed via the mobile device. Such mood data may quantify a frustration parameter based at least in part on interaction of a user with a user interface mode portion of a user interface (see FIG. 1).

Processing may continue from operation 202 to operation 204, "associate the mood data with mode data", where the mood data and the mode data may be associated with one another. For example, associating the mood data with mode data may be done in the mobile device or by a remote system to which the mode data (mode of operation) and the mood data are reported by the mobile device. For example, a mobile device may report to a remote system (such as the mobile service provider 406 shown in FIG. 4) a sequence of distinguishable, identifiable and/or functionally-operative input operations, from which the remote system may determine the current mode of the mobile device and associate the current mode with sensed mood data also sent from the mobile device. Alternatively, the mobile device might itself determine the mode from the input operations and then report the mode directly to the remote system, for example by using code in which each code word or number corresponds to one mode. (Such as is illustrated in FIG. 4, discussed below.) The mobile device may also identify both the current mode and the mood data registered during that mode; associate the mood data with a current mode, an immediately preceding mode, or some other mode or combination or modes; and report with the mood data and the associated mode to the remote system, either in the format of one or more digital numbers, or in some other form. For example, in the case of two digital numbers, a first number might represent a mood parameter such as keystroke force, and a second number might represent the current or preceding or following mode. In another example, in the case of a single digital number, such a number might represent a particular combination of a mode and a mood datum. Additional or alternative ways of encoding a mood datum and its associated mode of operation that would be apparent to persons skilled in the art may be utilized.)

Processing may continue from operation 204 to operation 206, "transfer the mood data and the mode data", where the mood data and (optionally) the mode data may be transferred. For example, the mood data and the mode data may be transferred via radio waves or other transitory media from the mobile device to a mobile service provider portion of the communication network, or, by non-transitory media in alternate embodiments (e.g., a removable card). Some additional and/or alternative details related to process 200 may be illustrated in one or more examples of implementations discussed in greater detail below with regard to FIG. 4.

Figure 3:
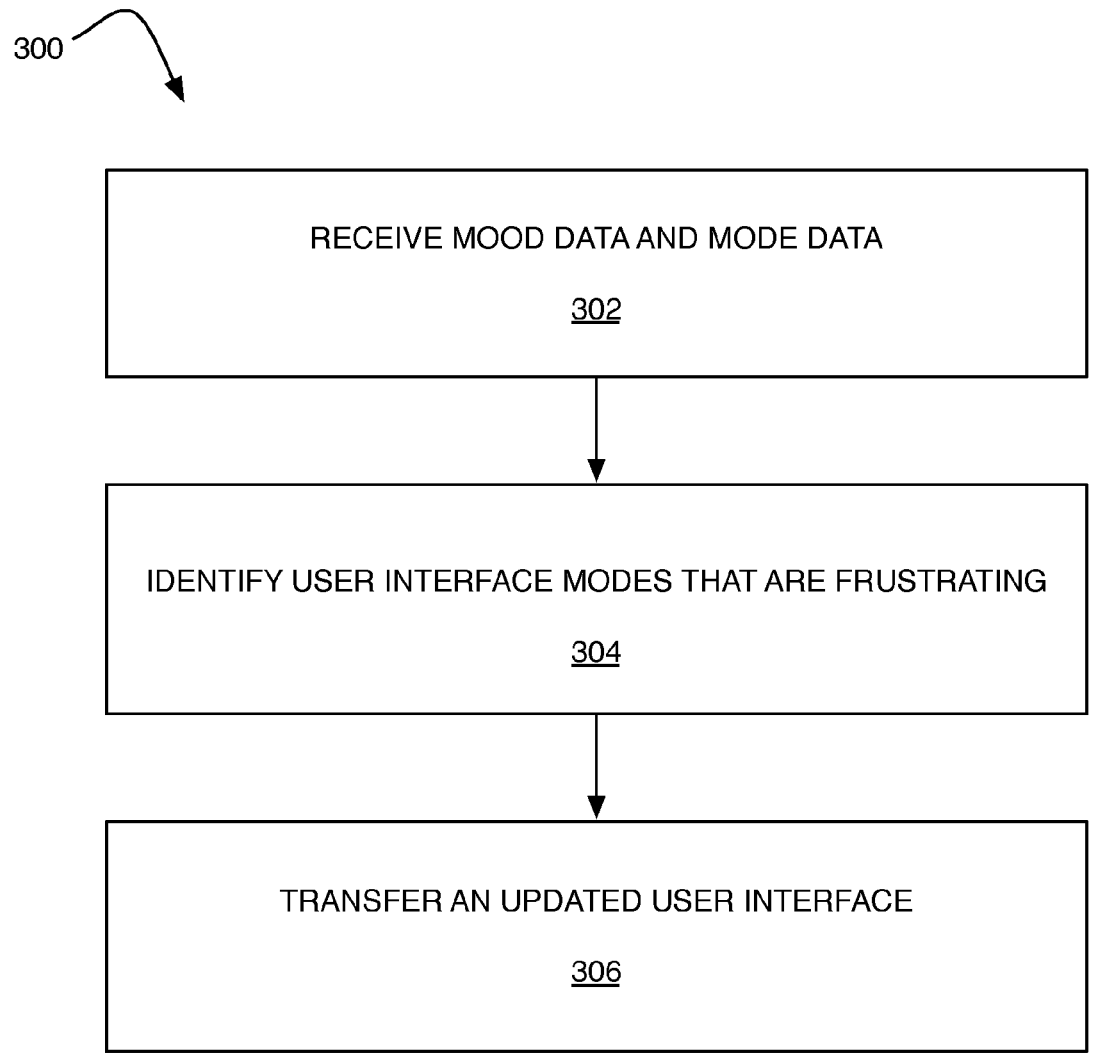
FIG. 3 illustrates another example process for quantifying frustration via a user interface that is arranged in accordance with at least some embodiments of the present disclosure.

Another embodiment is illustrated in FIG. 3, which illustrates another example process for quantifying frustration via a user interface that is arranged in accordance with at least some embodiments of the present disclosure. Process 300 may include one or more of operations as illustrated by operations 302, 304, and/or 306.

As illustrated, process 300 may be implemented for quantifying frustration via a user interface that may be implemented in a communication network (see FIG. 4) associated with a plurality of mobile devices (see FIG. 4). Processing may begin at operation 302, "receive mood data and mode data", where mood data and mode data from one or more of the plurality of mobile devices may be received. For example, mood data and mode data from one or more of the plurality of mobile devices may be received via a mobile service provider (see FIG. 4) portion of the communication network. Such mood data may quantify a frustration parameter. Such a quantification of a frustration parameter may be based at least in part on interaction of a user with a user interface mode portion of a user interface or other function or portion of an individual mobile device.

Processing may continue from operation 302 to operation 304, "identify user interface modes that are frustrating", where one or more user interface modes that are frustrating may be identified. For example, one or more user interface modes that are frustrating may be identified based at least in part on the mood data and the mode data.

Processing may continue from operation 304 to operation 306, "transfer an updated user interface", where at least a portion of an updated user interface may be transferred. For example, at least a portion of an updated user interface may be transferred to one or more of the plurality of mobile devices based at least in part on the identification of the one or more user interface modes that are frustrating. Some additional and/or alternative details related to process 300 may be illustrated in one or more examples of implementations discussed in greater detail below with regard to FIG. 4.

FIG. 4 illustrates a further example process for quantifying frustration via a user interface that is arranged in accordance with at least some embodiments of the present disclosure. Process 400 may include one or more of operations as illustrated by operations 412, 414, 416, 424, and/or 426.

As illustrated, process 400 may be implemented for quantifying frustration via user interface 100 that may be implemented in a communication network 402 associated with a plurality of mobile devices 404. As used herein the term "communication network" may refer to any number of communication systems including a plurality of mobile devices adapted for wireless communication with one another via the communication network. For example, such a communication network 402 may refer to any number of communication systems including one or more of the following: a cellular phone network, a mobile worldwide interoperability for microwave access network (WiMax), voice over Internet protocol (IP) system (e.g., via a wireless local area network (WLAN), a wireless wide area network (WWAN), or the like), the like, and/or combinations thereof, according to the particular application.

Communication network 402 may include one or more mobile devices 404. Mobile devices 404 may be arranged (e.g., coupled) in communication with mobile service provider portion 406 of communication network 402. As used herein the term "mobile device" may refer to mobile devices such as a cell phone, a personal data assistant (PDA), the like, and/or combinations thereof, for example. As used herein the term "mobile service provider" may refer to a mobile service provider portion of communication network such as a central management center, a mobile phone network operator, or the like that is configured to facilitate communication among a plurality of mobile devices.

Processing may begin at operation 412, "sense mood data", where mood data may be sensed. For example, mood data may be sensed via a senor 405 associated with mobile device 404. For example, mobile device 404 may utilize sensor 405 to measure the keystroke dynamics of the user's fingers, either on keys, an entire keypad, on a stroke/tap touch screen surface, the like, and/or combinations thereof. For example, the peak force of a single tap or keystroke might be a mood datum; another example of a mood datum might be the speed of a swipe across a surface such as a touchscreen; still another mood datum might be a combination of swipe speed and swipe pressure, sensed by one or more sensors and calculated by a processor inside the mobile device 404. In general, such mood data may include data from detection of one or more of the following: tap timing, tap strength, sweep timing, sweep strength, the like, and/or combinations thereof. Such timing and/or strength might be measured based at least in part on the force exerted by the user's fingers, the attack (e.g., a rise time of the force), the acceleration (e.g., an indication of hitting or strong tapping), the keystroke timing (e.g., a "dwell" time, such as the duration of key depression or pressure) the like, and/or combinations thereof.

Additionally or alternatively, such mood data may include data from detection of verbal expletives (e.g., cursing, shouting, the like, and/or combinations thereof). For example, mobile device 404 may listen for verbal expletives, either by speech analysis or, more simply, by detecting isolated words or just isolated sounds via one or more sensors 405.

Accordingly, sensor 405 may include one or more sensors capable of sensing such mood data types (e.g., such as one or more force sensors, motion sensors, a microphone, the like, and/or combinations thereof). For example, mobile devices 404 may be equipped with touch screens associated with one or more force sensors for touch screen operability, and the output from these force sensors may also be utilized in process 400. Alternatively, mobile devices 404 may be equipped with one or more sensors 405 dedicated to use in process 400.

Processing may continue from operation 412 to operation 414, "associate the mood data with mode data", where the mood data and the mode data may be associated with one another. For example, associating the mood data with mode data may be done via mobile device 404. Such mode data may identify the user interface mode portion of user interface 100.

A useful feature of one or more examples is that the mood data does not necessarily need to be interpreted. A mood datum may in some cases be a number associated with some measured physical quantity that may be measured in conjunction with one mode of operation (e.g., during the mode); this is discussed below in more detail. The mood datum might be, for example, the maximum force (in pounds, newtons, or some arbitrary unit of the sensor) with which a user presses a key or a touchscreen during a particular mode (e.g., while setting the alarm clock on a cell phone). This datum by itself may not be an accurate measure of the user's mood, or of the general level of frustration caused by the mode of operation associated with the mood datum. However, accuracy and precision may be provided by including a summing memory or database in which all (or a collection of a portion of all) the mood data associated with one mode of operation may be collected. When the mood data associated with one mode may be collected, for example by adding them all up, the resulting sum may provide an accurate measure of the average or typical user's mood when using that mode. In some examples, therefore, the mood data associated with the user interface mode may include a composite value that may be based at least in part on a plurality of measurements of the frustration parameter. For example multiple data measurements from a single user may be aggregated into a composite value (such as by averaging or the like) prior to (or after) transfer to mobile service provider 406. This concept described above is set out in greater detail in the discussion of FIG. 7 below.

As discussed above, in one example the mood data from many users may be collected, aggregated into a composite value (such as by averaging or the like), stored, output, or otherwise made available as a measure of the frustration associated with the mode for which the mood data was collected, without any need to know about a particular user's personality, environment, etc. However, other examples may take into account the user's habits. For example, one cell phone might belong to a person who is strong, drinks too much coffee, is constantly angry, and/or uses great force while operating the phone (and/or exhibiting other signs of anger, such as prolonged key pressing and cursing); a second cell phone might belong to a person who is weak, never drinks coffee, practices yoga, and/or use minimal force on the phone. In such examples, the mood can, additionally or alternatively, be adjusted based at least in part on a baseline behavior (e.g., be weighted in comparison to a baseline) to get a more accurate measure of a particular person's mood, or measure variations from a baseline determined for the individual person. Such baseline behavior does not necessarily need to be taken into account in all examples, as the two users in the example above both may likely vary their mood data as a function of the mode. In some examples, therefore, the mood data associated with the user interface mode may include a value that may be adjusted based at least in part on a baseline behavior of individual user behavior. A baseline-weighted mood datum may be useful for identifying frustration in a particular user, rather than a mode of operation that is generally frustrating.

Processing may continue from operation 414 to operation 416, "transfer the mood data and the mode data", where the mood data and the mode data may be transferred. For example, the mood data and the mode data may be transferred via mobile device 404 to mobile service provider 406 portion of communication network 402.

Processing may continue from operation 416 to operation 424, "identify user interface modes that are frustrating", where one or more user interface modes that are frustrating may be identified. For example, one or more user interface modes that are frustrating may be identified based at least in part on the mood data and the mode data via mobile service provider 406. In some examples, the identification of the one or more user interface modes that are frustrating may be based at least in part on identifying the mood data that crosses threshold criteria.

In some examples, an identification of user interface modes that are frustrating may be determined based on one or more levels of abstraction/specificity. For example, an identification of user interface modes that are frustrating may be determined based at least in part on data associated with all users of mobile devices 404, data associated with a subset of all users of mobile devices 404, data associated with a subset of all users of mobile devices 404 who fall into a designated demographic (age, location, etc.), and/or data associated with an individual user of a mobile device 404. For example multiple data measurements from multiple users may be aggregated into a composite value (such as by averaging or the like) via mobile service provider 406, as mentioned above. However, data on any individual does not necessarily need to be stored, and may instead be subsumed in the composite value, or other measure of frustration, associated with a particular mode of operation), whereby privacy may be enhanced.

Processing may continue from operation 424 to operation 426, "Modify the mobile device(s)," where one or more mobile devices may be modified. For example, at least a portion of an updated user interface, program update, etc., may be transferred to mobile devices 404. For example, at least a portion of an updated user interface may be transferred to one or more of the plurality of mobile devices 404 from mobile service provider 406 based at least in part on the identification of the one or more user interface modes that are frustrating. Additionally or alternatively, the physical design or software of mobile devices 404 may be redesigned based at least in part on the frustration caused by the design, and such redesign changes may be incorporated into future mobile devices. Additionally or alternatively, communication network 402 may itself be modified based at least in part on measured frustration.

In some examples, such modifications may be made based on one or more levels of abstraction/specificity. For example, a transfer an updated user interface may be made to all users of mobile devices 404, a subset of all users of mobile devices 404, a subset of all users of mobile devices 404 who fall into a designated demographic (age, location, etc.) and/or who meet a certain criterion (e.g., a given level of frustration or the like), and/or an individual user of a mobile device 404. Accordingly, the identification of the one or more user interface modes that are frustrating and/or the transfer of at least a portion of an updated user interface may be performed on an individual user basis or performed on the basis of a group of users (e.g., all users or a subset of all users).

Additionally or alternatively, apologies and/or offers of help may be sent to individual users from mobile service provider 406 based at least in part on the identification of the one or more user interface modes that are frustrating. For example, such apologies and/or offers of help may be sent as a real-time response to user frustration.

While process 300 and process 400 have been described above as primarily performing operations via mobile service provider 406, it will be appreciated that some or all of these operations may be performed for mobile service provider 406 through a separate entity/device associated with the mobile service provider 406. As used herein, the term "mobile service provider" refers to any group of entities/devices configured to perform the operations designated to mobile service provider 406 in process 300 and/or process 400. Additionally or alternatively, the allocation of circuitry and analysis operations of processes 200, 300, and/or 400 between mobile device 404 and mobile service provider 406 is a matter of design choice; only the sensors must be physically located with mobile device 404.

Figure 7:
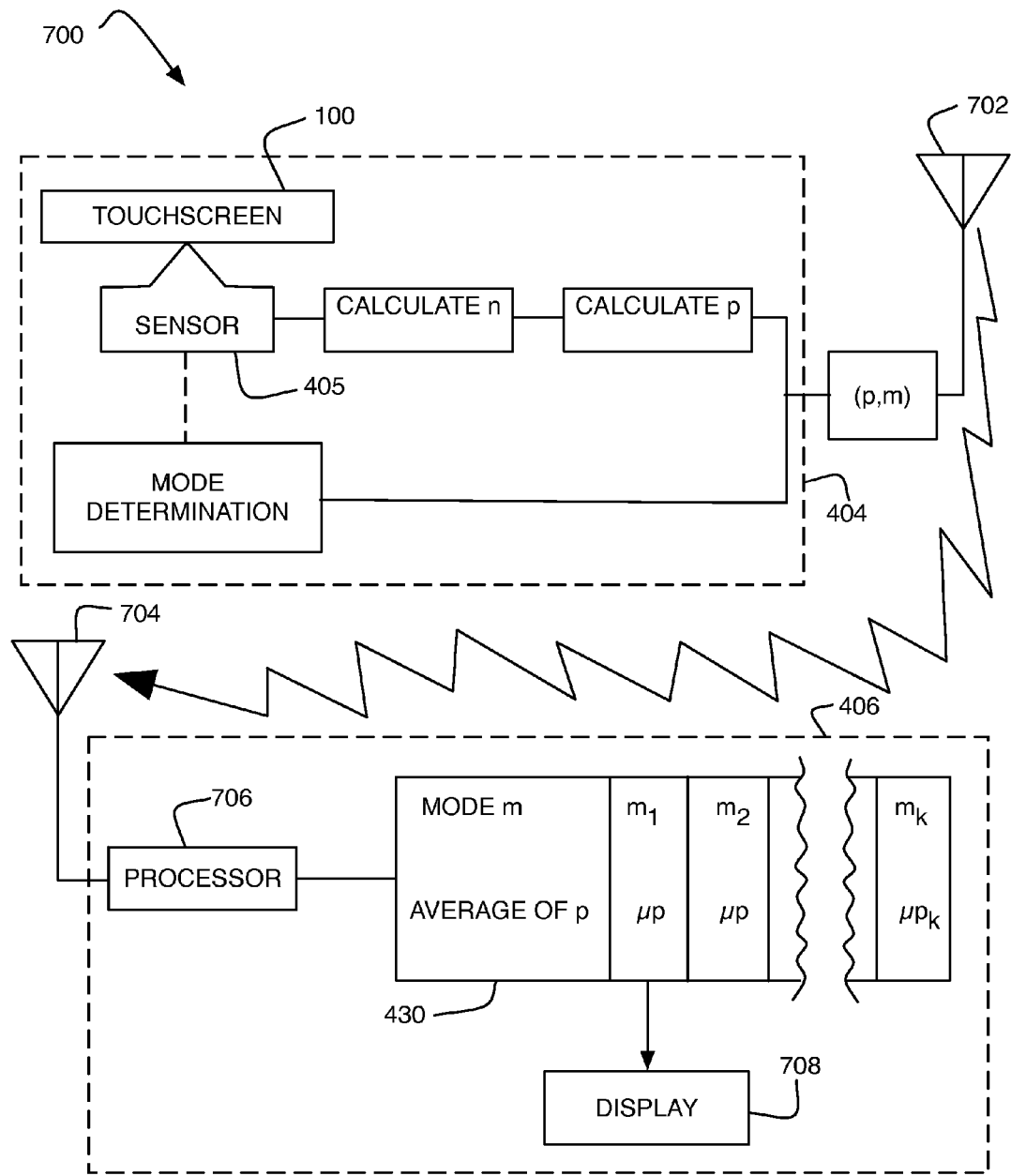
FIG. 7 is a schematic diagram of an illustrative embodiment of a system for quantifying frustration via a user interface arranged in accordance with at least some embodiments of the present disclosure.

FIG. 7 is a schematic diagram of an illustrative embodiment of a system 700 for quantifying frustration via a user interface arranged in accordance with at least some embodiments of the present disclosure. In operation, mobile device 404 of system 700 may continually measure the user's degree of frustration, as indicated by the behavior measured by one or more sensors 405, and may calculate a number n indicative of the degree of frustration according to a predetermined formula. For example, each keystroke on a touch-screen-type user interface 100 might generate a number n based on the force and attack. An expletive might generate another such number n.

In some examples, each calculated number n may be generated during a particular function, transfers between functions, or group of functions and/or transfers of the mobile device 404 (e.g., a "mode" or "mode of operation," which may be denoted m). Mobile device 404 may note when a mode m starts and when it ends, and mobile device 404 may collect the numbers n indicative of the user's frustration during that interval (or the preceding interval, if the keystroke changes the mode, for example).

Mobile device 404 may then calculate a composite value (e.g., an average or other mathematical combination) of those numbers n over the time interval during which the user was in the mode m. That is, while mobile device 404 is in a given mode, one or more numbers n indicative of frustration may be generated; mobile device 404 may combine these numbers n into a frustration parameter (denoted as p) associated with that given mode m.

Having determined the mode m and the associated frustration parameter p, mobile device 404 may then communicate to mobile service provider 406 a data pair (p,m) including the frustration parameter p and the associated mode m. The data may optionally be sent from antennae 702 to antennae 704 via radio waves, as illustrated. Mobile service provider 406 may incorporate the received data pair (p,m) into a database 430 associated with mobile service provider 406. Such a database may be set up in such a way that each one of the various modes m may be correlated with a composite value combining the mood data from many users. For example, for each individual mode m, the system calculates (e.g., via processor 706) an average frustration parameter μp (or other combination) of all the mood data that have been sent to mobile service provider 406 from the various users' mobile devices 404. Accordingly, a series of modes m, may be associated with corresponding k measures μp;, with i running from 1 to k (if there are k modes m of interest).

Mobile service provider 406 may continually or periodically update average frustration parameters μ$p_i$. Such updated average frustration parameters pp may be accessed from the database (e.g., via display 708) to find out which of the modes m is frustrating to the users, and action may be taken to correct any especially frustrating modes m. Additionally or alternatively, other types of data can also be supplied: for example, mobile service provider 406 may generate data showing the amount of frustration over all modes for any particular time, as might be utilized to track trends.

As mentioned above, users may vary in strength, temperament, caffeine intake, and other variables, and may have various individual stroking behaviors. While the data from a given user at a given time might be unreliable as a measure of frustration, the average (or other combination) that is stored in the database may be more accurate because variables other than emotion may be statistically independent of each other, and therefore their effects will cancel out. Alternatively, the data from a given user may be value adjusted based at least in part on a baseline behavior of individual user.

FIG. 5 illustrates an example computer program product 500 that is arranged in accordance with at least some examples of the present disclosure. Program product 500 may include a signal bearing medium 502. Signal bearing medium 502 may include one or more machine-readable instructions 504, which, if executed by one or more processors, may operatively enable a computing device to provide the functionality described above with respect to FIG. 2, FIG. 3, and/or FIG. 4. Thus, for example, referring to the system of FIG. 4 one or more mobile devices 404 and/or mobile service providers 406 may undertake one or more of the actions shown in FIG. 2, FIG. 3, FIG. 7, and/or FIG. 4 in response to instructions 504 conveyed by medium 502.

In some implementations, signal bearing medium 502 may encompass a non-transitory computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass communications medium 510, such as, but not limited to, a digital and/or an analog communication medium (e.g., a fiber optic cable, a waveguide, a wired communications link, a wireless communication link, etc.).

Figure 6:
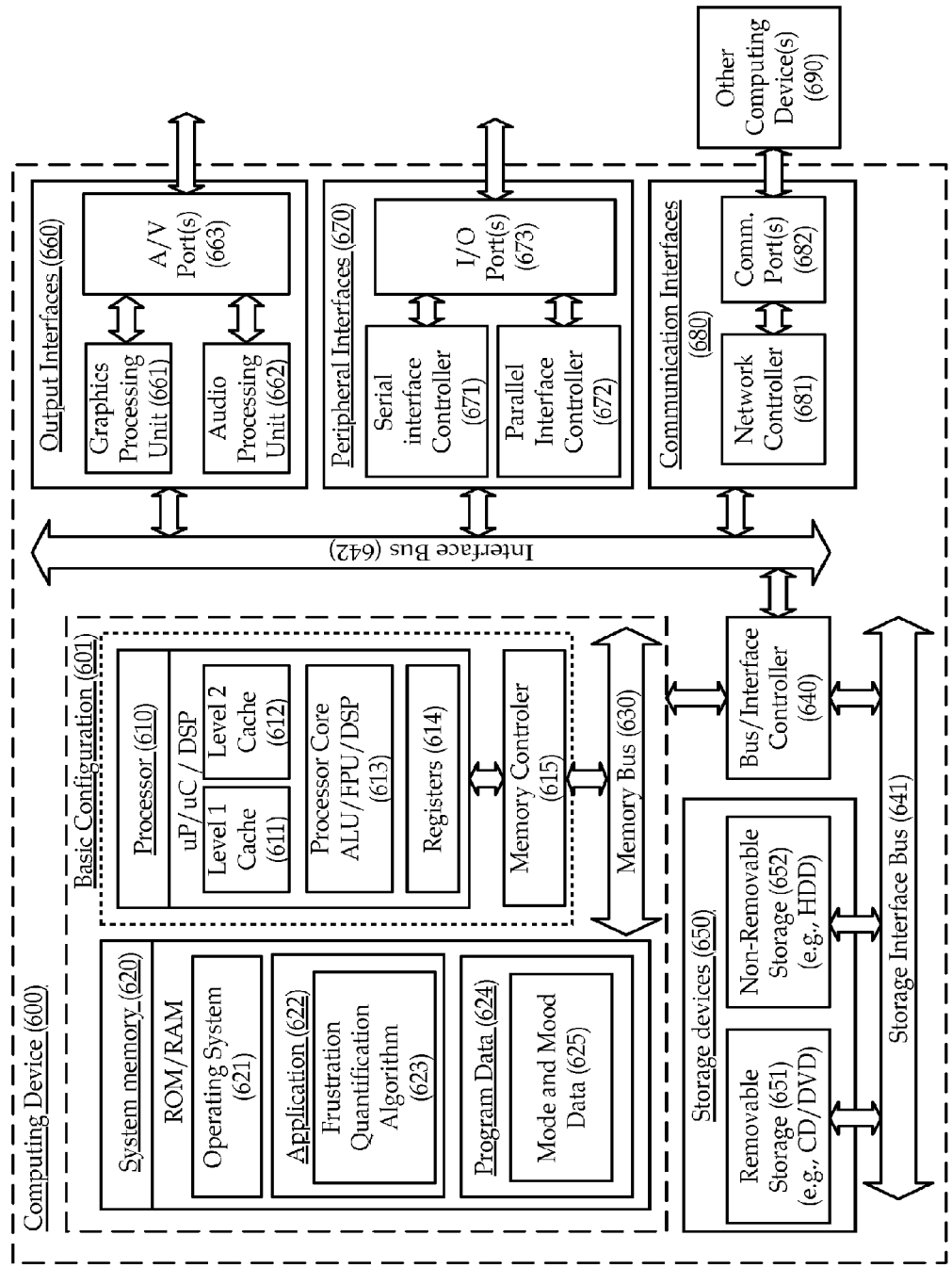
FIG. 6 is a block diagram of an illustrative embodiment of a computing device arranged in accordance with at least some embodiments of the present disclosure.

FIG. 6 is a block diagram illustrating an example computing device 600, such as might be embodied by a person skilled in the art, that is arranged in accordance with at least some embodiments of the present disclosure. In one example configuration 601, computing device 600 may include one or more processors 610 and system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 may include one or more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a frustration quantification algorithm 623 in a communication network that is arranged to perform the functions as described herein including the functional blocks and/or actions described with respect to process 200 of FIG. 2, process 300 of FIG. 3, FIG. 7, and/or process 400 of FIG. 4. Program Data 624 may include mode and/or mood data 625 for use with frustration quantification algorithm 623. In some example embodiments, application 622 may be arranged to operate with program data 624 on an operating system 621 such that implementations of frustration quantification in communication networks may be provided as described herein. For example, one or more mobile devices 404 and/or mobile service providers 406 may comprise all or a portion of computing device 600 and be capable of performing all or a portion of application 622 such that implementations of frustration quantification in communication networks may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more NV ports 663. Example peripheral interfaces 660 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 690 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the* same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method implemented in a communication network associated with a plurality of mobile devices, comprising:
    receiving, via a mobile service provider portion of the communication network, mood data and mode data from one or more of the plurality of mobile devices, wherein:
        the mood data quantifies a frustration parameter based at least in part on interaction of a user with a user interface mode portion of a user interface of an individual mobile device, and
        the mood data associated with the user interface mode comprises a composite value based at least in part on a plurality of measurements of the frustration parameter associated with a time interval during which the user was in the associated user interface mode;
    identifying, via the mobile service provider, one or more user interface modes that are frustrating based at least in part on the mood data and the mode data; and
    transferring, via the mobile service provider, at least a portion of an updated user interface to one or more of the plurality of mobile devices based at least in part on the identification of the one or more user interface modes that are frustrating.

2. The method of claim 1, wherein the identification of the one or more user interface modes that are frustrating is based at least in part on identifying the mood data that crosses a threshold criteria.

3. The method of claim 1, wherein the mood data associated with the user interface mode comprises a value adjusted based at least in part on a baseline behavior of individual user behavior.

4. The method of claim 1, wherein the user interface mode includes a group of one or more functions and transfers between the functions.

5. The method of claim 1, wherein the user interface mode includes a group of one or more functions and transfers between the functions, wherein the one or more functions are associated with one or more of the following: a user interface screen, a user interface menu, a user interface icon, a text box, a user interface button, a user interface check box, a user interface folder, a user interface file, and a voice command interface.

6. The method of claim 1, wherein the mood data includes data from detection of one or more of the following: tap timing, tap strength, sweep timing, and sweep strength.

7. The method of claim 1, wherein the mood data includes data from detection of verbal expletives.

8. The method of claim 1, wherein the identification of the one or more user interface modes that are frustrating and the transfer of at least a portion of an updated user interface are both performed on an individual user basis.

9. The method of claim 1, wherein the identification of the one or more user interface modes that are frustrating and the transfer of at least a portion of an updated user interface are both performed on the basis of a group of users.

10. The method of claim 1, further comprising transferring, via the mobile service provider, a message to one or more of the plurality of mobile devices based at least in part on the identification of the one or more user interface modes that are frustrating.

11. The method of claim 10, wherein the message includes one or more of the following: an apology message and an offer for help message.

12. The method of claim 11, wherein the message is transferred as a real-time response to user frustration.

13. A method implemented in a mobile device associated with a communication network, comprising:
sensing, via the mobile device, mood data that quantifies a frustration parameter based at least in part on interaction of a user with a user interface mode portion of a user interface, wherein the mood data associated with the user interface mode comprises a composite value based at least in part on a plurality of measurements of the frustration parameter associated with a time interval during which the user was in the associated user interface mode;
associating, via the mobile device, the mood data with mode data, wherein the mode data identifies the user interface mode portion of a user interface; and
transferring, via the mobile device, the mood data and the mode data to a mobile service provider portion of the communication network.

14. The method of claim 13, further comprising, receiving, via the mobile device, at least a portion of an updated user interface based at least in part on transferred mood data and mode data.

15. The method of claim 13, wherein the mood data associated with the user interface mode comprises a value adjusted based at least in part on a baseline behavior of individual user behavior.

16. The method of claim 13, wherein the user interface mode includes a group of one or more functions and transfers between the functions.

17. The method of claim 13, wherein the user interface mode includes a group of one or more functions and transfers between the functions, wherein the one or more functions are associated with one or more of the following: a user interface screen, a user interface menu, a user interface icon, a text box, a user interface button, a user interface check box, a user interface folder, a user interface file, and a voice command interface.

18. The method of claim 13, wherein the mood data includes data from detection of one or more of the following: tap timing, tap strength, sweep timing, and sweep strength.

19. The method of claim 13, wherein the mood data includes data from detection of verbal expletives.

20. A mobile service system, comprising:
a mobile service provider portion of a communication network configured to facilitate communication among a plurality of mobile devices, the mobile service provider portion configured to:
receive mood data and mode data from one or more of the plurality of mobile devices, wherein:
the mood data quantifies a frustration parameter based at least in part on interaction of a user with a user interface mode portion of a user interface of an individual mobile device, and
the mood data associated with the user interface mode comprises a composite value based at least in part on a plurality of measurements of the frustration parameter associated with a time interval during which the user was in the associated user interface mode;
identify one or more user interface modes that are frustrating based at least in part on the mood data and the mode data; and
transfer at least a portion of an updated user interface to one or more of the plurality of mobile devices based at least in part on the identification of the one or more user interface modes that are frustrating.

21. The system of claim 20, wherein the mood data associated with the user interface mode comprises a value adjusted based at least in part on a baseline behavior of individual user behavior.

22. The system of claim 20, wherein the identification of the one or more user interface modes that are frustrating and the transfer of at least a portion of an updated user interface are both performed on the basis of a group of users.

23. An apparatus, comprising:
a mobile device associated with a communication network, the mobile device configured to:
sense mood data that quantifies a frustration parameter based at least in part on interaction of a user with a user interface mode portion of a user interface, wherein the mood data associated with the user interface mode comprises a composite value based at least in part on a plurality of measurements of the frustration parameter associated with a time interval during which the user was in the associated user interface mode;
associate the mood data with mode data, wherein the mode data identifies the user interface mode portion of a user interface; and
transfer the mood data and the mode data to a mobile service provider portion of the communication network.

24. The apparatus of claim 23, wherein the mood data associated with the user interface mode comprises a value adjusted based at least in part on a baseline behavior of individual user behavior.

25. The apparatus of claim 23, wherein the mobile device is further configured to: receive at least a portion of an updated user interface based at least in part on transferred mood data and mode data.

26. An article comprising:
a non-transitory signal bearing medium comprising machine-readable instructions stored thereon, which, if executed by one or more processors, operatively enable a computing device to:
receive, via a mobile service provider portion of a communication network, mood data and mode data from one or more of a plurality of mobile devices, wherein:
the mood data quantifies a frustration parameter based at least in part on interaction of a user with a user interface mode portion of a user interface of an individual mobile device, and
the mood data associated with the user interface mode comprises a composite value based at least in part on a plurality of measurements of the frustration parameter associated with a time interval during which the user was in the associated user interface mode;

identify, via the mobile service provider, one or more user interface modes that are frustrating based at least in part on the mood data and the mode data; and transfer, via the mobile service provider, at least a portion of an updated user interface to one or more of the plurality of mobile devices based at least in part on the identification of the one or more user interface modes that are frustrating.

27. A method, comprising:

receiving mood data and mode data from one or more of a plurality of mobile devices associated with a mobile service provider portion of a communication network, wherein:

the mood data quantifies a frustration parameter based at least in part on interaction of a user with a user interface mode portion of a user interface of an individual mobile device, and the mood data associated with the user interface mode comprises a composite value based at least in part on a plurality of measurements of the frustration parameter associated with a time interval during which the user was in the associated user interface mode;

identifying one or more user interface modes that are frustrating based at least in part on the mood data and the mode data; and transferring at least a portion of an updated user interface to one or more mobile devices based at least in part on the identification of the one or more user interface modes that are frustrating.

28. The method of claim 27, wherein the one or more mobile devices include at least one mobile device that is not included in the plurality of mobile devices.

29. The method of claim 27, wherein the mood data associated with the user interface mode comprises a value adjusted based at least in part on a baseline behavior of individual user behavior.

30. The method of claim 27, wherein the user interface mode includes a group of one or more functions and transfers between the functions, wherein the one or more functions are associated with one or more of the following: a user interface screen, a user interface menu, a user interface icon, a text box, a user interface button, a user interface check box, a user interface folder, a user interface file, and a voice command interface.

31. The method of claim 27, wherein the mood data includes data from detection of one or more of the following: tap timing, tap strength, sweep timing, and sweep strength.

32. The method of claim 27, wherein the mood data includes data from detection of verbal expletives.

* * * * *

UNITED STATES PATENT AND TRADEMARK OFFICE
CERTIFICATE OF CORRECTION

PATENT NO. : 8,671,347 B2
APPLICATION NO. : 13/499402
DATED : March 11, 2014
INVENTOR(S) : Bromer Page 1 of 1

It is certified that error appears in the above-identified patent and that said Letters Patent is hereby corrected as shown below:

On the title page, item (57), under "ABSTRACT", in Column 2, Line 3, delete "embodiment" and insert -- embodiment, --, therefor.

On the title page, item (57), under "ABSTRACT", in Column 2, Line 12, delete "service provide" and insert -- service provider --, therefor.

In the Specification

Column 2, Lines 25-26, delete "and outputting............operation." and insert the same at Line 24, after "function;" as a continuation of paragraph.

Column 10, Line 20, delete "m," and insert -- $m_i$ --, therefor.

Column 10, Line 21, delete "μp;," and insert -- $\mu p_i$, --, therefor.

Column 10, Line 25, delete "pp" and insert -- μp --, therefor.

Column 12, Line 16, delete "NV" and insert -- A/V --, therefor.

Column 14, Line 54, delete "achieve the*" and insert -- achieve the --, therefor.

Signed and Sealed this
Seventeenth Day of February, 2015

Michelle K. Lee
*Deputy Director of the United States Patent and Trademark Office*